3,558,506
GELLING MIXTURES FOR SOLUBLE SILICATES

Bernard Bonnel, Lyon, and Ghislain Schwachhofer, Miribel, France, assignors to Progil, Paris, France, a corporation of France
No Drawing. Filed Mar. 17, 1967, Ser. No. 623,820
Claims priority, application France, Mar. 24, 1966, 47,083
Int. Cl. B01j 13/00; C09j 1/02; E02d 3/12
U.S. Cl. 252—316      4 Claims

ABSTRACT OF THE DISCLOSURE

A new gelling mixture for alkali metal silicates to render them suitable for soil consolidation and stabilization, the gelling agent being a mixture of methyl formate, methyl acetate and methyl propionate which may also contain methanol.

---

The present invention relates to a new gelling mixture for alkali metal silicates, and more particularly to new compositions based on silica gel and transformable into a coherent and hard mass, as well as the use of these gels in various applications, such as, especially soil consolidation and stabilization.

It is known that by adding some organic reagents to alkali metal silicates, it is possible to obtain silica gels capable of being transformed into a hard mass having cement-like characteristics. Among the numerous reagents which have been suggested heretofore are: fatty acids, phenols, aliphatic acid amides such as formamide, organic monoacid esters such as methyl or ethyl acetate, polyol esters such as diacetin or triacetin, or mixtures of these products. However, it has never been proposed heretofore to use mixtures of several esters, each having a different monoacid group, but having the same alkyl radical.

It has now been found that mixtures of aliphatic monoacid methyl esters are very good gelling agents for alkali metal silicates, the efficiency of which is greater than that obtained by the use of already known mono-alkyl esters, used alone or in mixture with organic reagents having functions different from esters.

The mixtures contemplated according to the present invention are made with the methyl esters of propionic acetic and formic acids.

The respective ratio of each of the three constituents may vary between large limits. However, it has been established that the most satisfactory mixtures were compositions of the following compositions:

|  | Percent by weight |
|---|---|
| Methyl formate | 10 to 25 |
| Methyl acetate | 86 to 60 |
| Methyl propionate | 4 to 15 |

The preparation of the gelling agents according to the present invention does not offer any difficulty. Of course, it is possible to obtain them by mixing their constituents in the proper ratios. However, it has been proved advantageous, for economical reasons to use directly the raw reaction product of the esterification with methanol of an acid mixture obtained, for example, by petroleum hydrocarbon oxidation.

It has been found that the presence of residual methanol in the gelling products according to the invention, has no disturbing effect on gelation when the ratio of this alcohol does not exceed 25% by weight, related to the total of the gelling agents. Moreover, the acid mixture usually obtained during this oxidation reaction contains respective ratios of the different acids which correspond to the required quantities of esters.

A reaction produtc of esterification such as indicated above usually contains by weight:

|  | Percent |
|---|---|
| Methyl formate | 11 to 14 |
| Methyl acetate | 60 to 65 |
| Methyl propionate | 5 to 7 |
| Methanol | 24 to 14 |

Numerous tests have been conducted which show that these ester mixtures are especially suitable as gelling reagents in the field of the present invention.

The alkali metal silicates capable of being gelled according to the invention may be sodium, potassium or lithium silicates or polysilicates, in which the molecular ratio $SiO_2/M_2O$ is between 2.0 and 5.0, preferably 3.4 to 5. (M-alkali metal). They are usually used in the form of aqueous solutions titrating 25 to 40% of dry extract, such as, for example, sodium silicate solutions titrating from 31 to 34 degrees Baumé (at 20° C.).

The relative ratios of the described methyl ester mixtures and alkali metal silicate may vary between large limits. However, the preferred quantities are 5 to 50 parts by weight (dry extract) to 100 parts of alkaline silicate (dry extract).

An easy method for expressing the relative quantities of the constituents in the compositions based on alkali metal silicates and reagent mixtures according to the invention consists in using the ratios:

$$a = \frac{\text{reagent weight}}{\text{silicate volume}} \qquad b = \frac{\text{water volume}}{\text{silicate volume}}$$

The varation of these ratios has an influence on the characteristics of the gels it is desired to obtain. The characteristics generally recognized as being the most important ones are: gelling time, resistance to compression, sensitiveness to water and viscosity of the mixture of reagent and silicates as well as the variation of viscosity with time. Practically the values required for these various characteristics vary with regard to the applications of the gels.

When the described mixture of methyl esters is used as a gelling agent, the ratios $a$ between 0.04 and 0.20, and $b$ between 0.6 and 2 result in gels satisfactory for all of the application requirements. Indeed, under such conditions, gelling times vary between 4 and 65 minutes, compression resistances between 3 and 14 kg./cm.$^2$ and viscosities, from about 2 to 6 centipoises, immediately after introducing the gelling mixture in the silicate, first increase slowly, then reach high values immediately before gel formation.

The new gel compositions according to the invention may be prepared according to classical techniques of gelling alkali metal silicates. According to an especially advantageous method of operation, the aqueous solution of the gelling reagent is introduced during a period of 1 to 2 minutes into the aqueous solution of alkali metal silicate maintained at room temperature, about 20° C.

The compositions obtained in that way are ready to be injected into the soils intended to be consolidated and/or strengthened. They are easy to handle and may be injected in especially dense ground, because of their weak initial viscosity, which is close to that of water. They give rise to the formation of gels extremely resistant to water, compression resistance of which is often greater than 10 kg./cm.$^2$ and which are transformed into a hard and coherent mass, similar to cement.

The quantities of the compositions to be used according to the invention, with regard to soils to be treated, are of course variable according to the type of soil (clayey, sandy, etc.). However, generally between 10 to 60% of these compositions are used with respect to soil weight; that is about 1 to 10% calculated by weight of the dry extract of the constituents, according to the invention.

The following example, quoted in a nonlimitative way, shows how the invention may be put into practice.

EXAMPLE

Series of gels have been prepared by mixing aqueous solutions of sodium silicates of 31° Bé., having variable ratios $a$ and $b$, with aqueous solutions containing 10% of various gelling reagents. Some reagents were mixtures according to the present invention and other ones were known reagents. The comparison of the results obtained emphasize the superiority of the mixtures according to the invention. The various used reagents are designated as follows:

Product A
Ethyl acetate.

Product B
Methyl acetate.

Product C

| | Percent by weight |
|---|---|
| Methyl formate | 15.9 |
| Methyl acetate | 74.8 |
| Methyl propionate | 9.3 |

Product D

| | |
|---|---|
| Methyl formate | 12.4 |
| Methyl acetate | 64.3 |
| Methyl propionate | 5.5 |
| Methanol | 17.8 |

Product E

| | |
|---|---|
| Methyl formate | 12.1 |
| Methyl acetate | 61.7 |
| Methyl propionate | 6.2 |
| Methanol | 20.0 |

Product F

| | |
|---|---|
| Methyl formate | 13.9 |
| Methyl acetate | 68.0 |
| Methyl propionate | 4.0 |
| Methanol | 14.1 |

The silicate used has the molar ratio $SiO_2/Na_2O$ equal to 3.92.

The following main characteristics of the obtained gels were measured:

(a) Gelling time, $Tp$, time necessary in order that the surface of a container filled with the gelling composition and inclined to the horizontal position, does not show deformation.

(b) Resistance to compression, $R$, measured by gel resistance to the sinking of a needle having a section of 1.18 cm.², this needle being connected to a dynamometric ring of 100 kg. on gels having been submitted to a 24-hour-aging and kept under 5 mm. of water. Measured time is one minute.

(c) Viscosity, $V$, measured at a temperature of 20° C. by means of the viscosimeter Eprecht of "Rheomat 15" type. The results obtained are given in the Table 1 hereinafter.

TABLE 1

| Ratios | | Products | | | | | | | | | | | | |
|---|---|---|---|---|---|---|---|---|---|---|---|---|---|---|
| | | A | | B | | C | | D | | E | | F | | |
| b | a | Tp, minutes | R, kg./cm.² | Tp, minutes | R, kg./cm.² | Tp, minutes | R, kg./cm.² | Tp, minutes | R, kg./cm.² | Tp, minutes | R, kg./cm.² | Tp, minutes | R, kg./cm.² | |
| 0.6 | 0.04 | 150 | 2.75 | 96 | 4.4 | | | 66 | 4.2 | 60 | 5.95 | 48 | 5.45 | |
| | 0.06 | 40 | 11.2 | 27 | 11.9 | 8 | 11.2 | 10 | 10.9 | 90 | 13.6 | | | |
| 0.8 | 0.05 | 104 | 5.5 | 95 | 4.85 | 55 | 6.2 | 51 | 5.7 | 51 | 5.5 | 33 | 7.7 | |
| | 0.06 | 77 | 6.3 | 35 | 9.5 | | | 23 | 8.9 | 23 | 9.8 | | | |
| 1 | 0.05 | 188 | 2.3 | 117 | 3.35 | | | 86 | 3.65 | | | 61 | 3.85 | |
| 1.2 | 0.1 | 28 | 7.3 | 25 | 7.5 | 12 | 10.8 | 7 | 9.9 | 8 | 9.45 | 5 | 10.5 | |
| 1.5 | 0.075 | 120 | 2.6 | 100 | 3.2 | | | | | 50 | 3.9 | 38 | 3.85 | |
| | 0.12 | 36 | 5.3 | 28 | 5.2 | | | 8 | 7.55 | 7 | 8.5 | 4 | 9.1 | |
| 2 | 0.15 | 47 | 2.8 | | | | | 52 | 3.2 | 50 | 3.1 | 37 | 3.25 | |
| | 0.20 | | | 15 | 3.0 | | | 15 | 4.2 | 12 | 5.5 | 6 | 5.9 | |

For the mixtures of reagents described in the Table hereinabove, the initial viscosity of the gelled silicate solution varied between 1.5 and 5 centipoises. The viscosity of a composition having a molecular ratio $SiO_2/Na_2O=3.92$ and for which $a=0.06$ and $b=0.8$, was 6 centipoises after 10 minutes and 10 centipoises after 16 minutes, gelling time being about 23 minutes.

Moreover, the obtained gels were extremely resistant to water action; some of them were kept entirely immersed in water for more than a month, with a degradation by weight rate lower than 1%.

What is claimed is:

1. A composition of matter consisting essentially of (1) an aqueous alkali metal silicate having up to 40% by weight of dry extract and (2) a gelling agent for said silicate consisting essentially of a mixture of 10–25% by weight of methyl formate, 60–86% by weight of methyl acetate and 4–15% by weight of methyl propionate, the respective weight ratios of said silicate and said gelling agent, as dry extracts, being 5–50 parts by weight of said gelling agent for 100 parts by weight of said alkali metal silicate.

2. A composition of matter according to claim 1, wherein the gelling agent consists essentially by weight of

| | Percent |
|---|---|
| Methyl formate | 11–14 |
| Methyl acetate | 60–65 |
| Methyl propionate | 5–7 |
| Methanol | 24–14 |

3. A composition of matter according to claim 1, wherein the alkali metal silicate has a molar ratio $SiO_2/M_2O$ between 2 and 5, where M is an alkali metal.

4. A composition of matter according to claim 1, wherein the alkali metal silicate has a molar ratio $SiO_2/M_2O$ between 3.4 and 5, where M is an alkali metal.

References Cited

UNITED STATES PATENTS

| 2,433,778 | 12/1947 | Marshall | 252—309 |
| 3,137,046 | 6/1964 | Barlow et al. | 106—38.35X |
| 3,202,214 | 8/1965 | McLaughlin, Jr. | |

RICHARD D. LOVERING, Primary Examiner

U.S. Cl. X.R.

61—36; 106—38.35, 74, 82; 252—317

UNITED STATES PATENT OFFICE
CERTIFICATE OF CORRECTION

Patent No. 3,558,506         Dated January 26, 1971

Inventor(s) Bernard BONNEL and Ghislain SCHWACHHOFER

It is certified that error appears in the above-identified patent and that said Letters Patent are hereby corrected as shown below:

Table 1 - Columns 3 and 4, under column E, Tp. minutes "90" should be ---9---.

Signed and sealed this 28th day of September 1971.

(SEAL)
Attest:

EDWARD M. FLETCHER, JR.
Attesting Officer

ROBERT GOTTSCHALK
Acting Commissioner of Pat